(12) United States Patent
Baba (10) Patent No.: US 10,217,024 B2
(45) Date of Patent: Feb. 26, 2019

(54) OBJECT DETECTION APPARATUS

(71) Applicant: DENSO CORPORATION, Kariya, Aichi-pref. (JP)

(72) Inventor: Takahiro Baba, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/513,520

(22) PCT Filed: Sep. 15, 2015

(86) PCT No.: PCT/JP2015/076117
§ 371 (c)(1),
(2) Date: Mar. 22, 2017

(87) PCT Pub. No.: WO2016/047495
PCT Pub. Date: Mar. 31, 2016

(65) Prior Publication Data
US 2017/0300780 A1  Oct. 19, 2017

(30) Foreign Application Priority Data
Sep. 24, 2014  (JP) ................ 2014-193891

(51) Int. Cl.
| G06K 9/00 | (2006.01) |
| G06K 9/62 | (2006.01) |
| B60R 21/00 | (2006.01) |
| G06T 7/20 | (2017.01) |
| G06T 7/246 | (2017.01) |
| G01S 13/86 | (2006.01) |
| G01S 13/93 | (2006.01) |

(Continued)

(52) U.S. Cl.
CPC ............ *G06K 9/6215* (2013.01); *B60R 21/00* (2013.01); *G01S 7/41* (2013.01); *G01S 13/867* (2013.01); *G01S 13/931* (2013.01); *G06K 9/00805* (2013.01); *G06K 9/4661* (2013.01); *G06T 7/20* (2013.01); *G06T 7/246* (2017.01); *G08G 1/166* (2013.01); *G01S 2013/9367* (2013.01); *G06K 2009/4666* (2013.01); *G06T 2207/10044* (2013.01); *G06T 2207/30241* (2013.01); *G06T 2207/30261* (2013.01)

(58) Field of Classification Search
None
See application file for complete search history.

(56) References Cited

U.S. PATENT DOCUMENTS

| 2014/0139369 A1 | 5/2014 | Baba |
| 2015/0066348 A1 | 3/2015 | Baba |

*Primary Examiner* — Stephen P Coleman
(74) *Attorney, Agent, or Firm* — Knobbe, Martens, Olson & Bear, LLP (57) ABSTRACT

In an object detection apparatus, a first trajectory estimation unit estimates a trajectory of a first object detected by an electromagnetic wave sensor. An optical flow acquisition unit image-processes a captured image acquired from a camera to acquire movement directions based on optical flows of feature points in the captured image. A movement direction match determination unit determines whether or not a match occurs between a movement direction based on the optical flows and a movement direction based on the trajectory of the first object. If a match occurs between the movement direction based on the optical flows of the plurality of feature points and the movement direction based on the trajectory of the first object, a sameness determination unit determines that a second object identified by the plurality of feature points and the first object are a same object.

10 Claims, 5 Drawing Sheets

(51) Int. Cl.
*G06K 9/46* (2006.01)
*G08G 1/16* (2006.01)
*G01S 7/41* (2006.01)

NORMAL CASE

OBJECT DETECTION APPARATUS

CROSS-REFERENCE TO RELATED APPLICATION

This application is based on and claims the benefit of priority from earlier Japanese Patent Application No. 2014-193891 filed Sep. 24, 2014, the description of which is incorporated herein by reference.

TECHNICAL FIELD

The present invention relates to techniques for detecting objects using a radar and a camera.

BACKGROUND ART

Vehicle collision avoidance systems are required to accurately detect objects, such as a vehicle other than an own vehicle that is a vehicle carrying the system and a pedestrian. For example, a vehicle collision avoidance system as disclosed in Patent Literature 1 is configured to detect objects using a radar and a camera. More specifically, the disclosed vehicle collision avoidance system uses a millimeter-wave radar and a monocular camera separately, and if a positional relationship between an object detected by the millimeter-wave radar and an object detected by the monocular camera meets a predetermined criteria (particularly, if these objects are in proximity to each other), determines that these objects are the same object.

CITATION LIST

Patent Literature

[Patent Literature 1] JP-A-2014-122873

SUMMARY OF THE INVENTION

Technical Problem

However, in a situation where an object detected by the millimeter-wave radar and an object detected by the monocular camera are in proximity to each other, these objects may be mistakenly recognized as the same object even if they are different objects.

In consideration of the foregoing, exemplary embodiments of the present invention are directed to providing an object detection apparatus capable of accurately determining whether or not objects detected using a radar and a camera are the same object.

Solution to Problem

In accordance with an exemplary embodiment of the present invention, there is provided an object detection apparatus. In the apparatus, a first trajectory estimation unit is configured to estimate a trajectory of a first object that is an object detected by an electromagnetic wave sensor configured to transmit and receive electromagnetic waves to detect a position of the object, and an optical flow acquisition unit is configured to image process a captured image acquired from a camera to acquire a large number of feature points in the captured image.

A movement direction match determination unit is configured to determine whether or not a match occurs between a movement direction based on optical flows of a plurality of feature points, of the large number of feature points, situated around the periphery of the first object and a movement direction based on the trajectory of the first object. A sameness determination unit is configured to, if a match occurs between the movement direction based on the optical flows of the plurality of feature points and the movement direction based on the trajectory of the first object, determine that a second object identified by the plurality of feature points and the first object are a same object.

With such a configuration of the above object detection apparatus, a trajectory of the first object detected by an electromagnetic wave sensor and optical flows acquired via image processing can be used to determine whether or not the first object and the second object are the same object. This configuration enables accurate determination as to whether or not the first object and the second object are the same object.

In the present invention, the term "a large number" is a concept representing more than "a plurality". The term "a large number" indicates that when the term "a plurality" represents 2 or more, the term "a large number" represents 3 or more. The scope of the present invention may include any possible combinations of claims.

The above and other objects, features and advantages of the present invention will be readily apparent and fully understood from the following detailed description of preferred embodiments, taken in connection with the appended drawings.

DESCRIPTION OF EMBODIMENTS

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

(Configuration)

A collision mitigation apparatus 1 in accordance with one embodiment of the present invention is an apparatus mounted in a mobile object, such as a vehicle. A vehicle carrying the collision mitigation apparatus 1 is hereinafter referred to as an own vehicle. The collision mitigation apparatus 1 is configured to detect an object (information about an object, such as a vehicle other than the own vehicle or a pedestrian) using a radar and a camera image, and in cases where the own vehicle is likely to collide with the object, perform control operations, such as braking the own vehicle, to avoid the collision or mitigate the impact of any possible collision between the object and the own vehicle. Particularly, the collision mitigation apparatus 1 of the present embodiment has the capability of accurately recognizing whether or not an object detected by the radar and an object detected by the camera are one object (i.e., the same object).

Figure 1A:
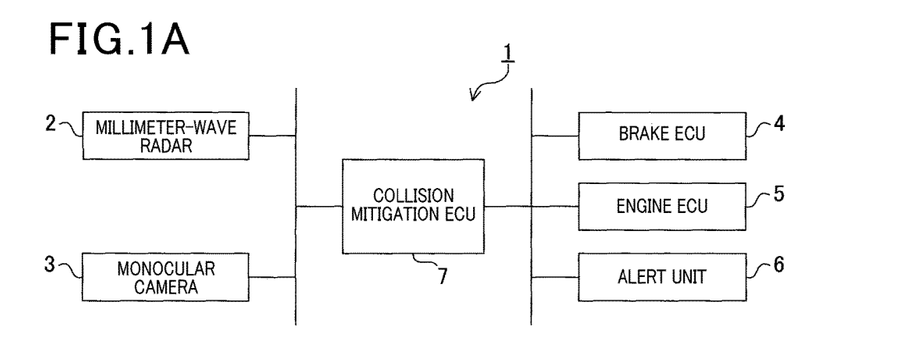
FIG. 1A is a block diagram of a collision mitigation apparatus in accordance with one embodiment of the present invention.

The collision mitigation apparatus 1, as shown in FIG. 1A, includes a millimeter-wave radar 2, a monocular camera 3, a brake electronic control unit (ECU) 4, an engine ECU 5, an alert unit 6, and a collision mitigation ECU 7. In the collision mitigation apparatus 1, for example, the collision mitigation ECU 7 is communicably connected to the millimeter-wave radar 2, the monocular camera 3, the brake ECU 4, the engine ECU 5, and the alert unit 6. Configurations to implement the communications are not particularly limited.

The millimeter-wave radar 2 is mounted in the front center (leading edge) of the own vehicle to detect objects, such as other vehicles and pedestrians, by using millimeter waves. The millimeter-wave radar 2 transmits millimeter waves forward from the own vehicle while scanning in a horizontal plane and receives millimeter waves reflected back to thereby transmit transmitted and received data in the form of radar signals to the collision mitigation ECU 7.

The monocular camera 3 includes a charge-coupled device (CCD) camera, and is mounted in the front center of an occupant compartment in the own vehicle. The monocular camera 3 transmits data of captured images in the form of image signals to the collision mitigation ECU 7.

The brake ECU 4 includes CPU, ROM, RAM, and others to control braking of the own vehicle. More specifically, the brake ECU 4 controls a brake actuator (brake ACT) in response to a detection value outputted from a sensor to detect a brake pedal depression amount, where the brake actuator serves as an actuator that opens and closes a pressure increasing control valve and a pressure reducing control valve provided in a brake hydraulic circuit. The brake ECU 4 controls the brake actuator following instructions from the collision mitigation ECU 7 so as to increase a braking force of the own vehicle.

The engine ECU 5 includes CPU, ROM, RAM, and others to control engine start/shutdown, a fuel injection amount, the ignition time, and others. More specifically, the engine ECU 5 controls a throttle actuator (throttle ACT) in response to a detection value outputted from a sensor to detect an accelerator pedal depression amount, where the throttle actuator serves as an actuator that opens and closes a throttle valve provided in an air intake conduit. The engine ECU 5 controls the throttle actuator following instructions from the collision mitigation ECU 7 so as to decrease a driving force of the internal-combustion engine.

The alert unit 6, upon reception of a warning signal from the collision mitigation ECU 7, acoustically and optically alerts a driver of the own vehicle.

The collision mitigation ECU 7 includes CPU, ROM, RAM, and others to integrally control the collision mitigation apparatus 1. The collision mitigation ECU 7 acquires radar signals from the millimeter-wave radar 2 and image signals from the monocular camera 3 every predetermined time interval based on a master clock of the CPU.

(Processing)

Figure 2:
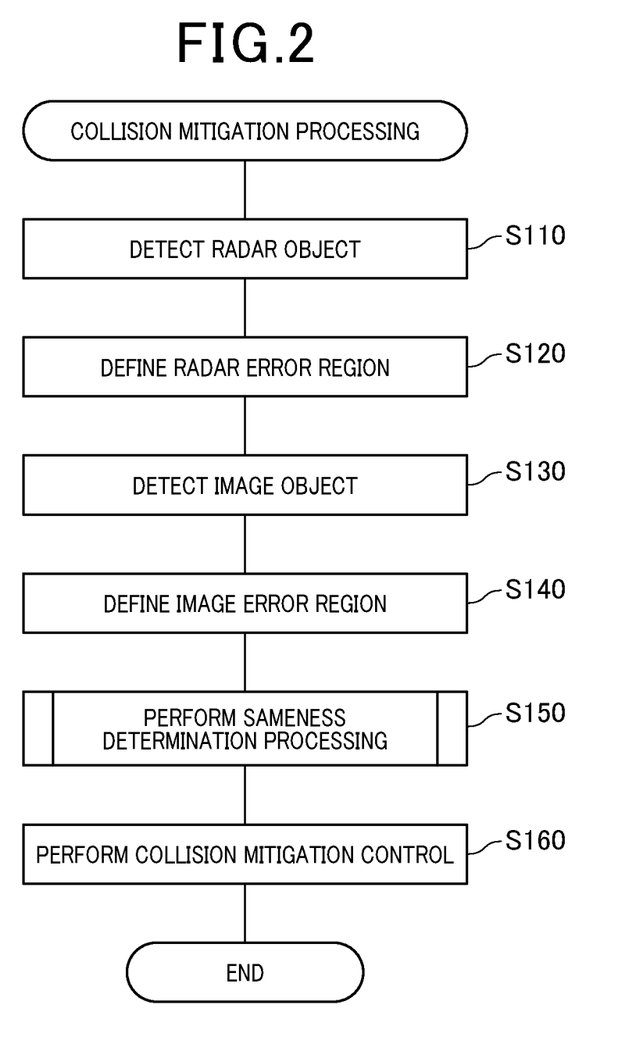
FIG. 2 is a flowchart of collision mitigation processing to be performed in the collision mitigation ECU.

There will now be described object detection and collision mitigation processing to be performed in the collision mitigation apparatus 1. A collision mitigation program, i.e., a program for the collision mitigation apparatus 1 to implement the object detection and collision mitigation processing, is stored in the collision mitigation ECU 7. This collision mitigation processing to be performed by the collision mitigation ECU 7 executing the program will be described with reference to FIG. 2. FIG. 2 illustrates a flowchart of the processing to be performed in the collision mitigation ECU 7 every predetermined time interval.

First, in the collision mitigation processing, as shown in FIG. 2, the collision mitigation ECU 7 detects an object based on a radar signal transmitted from the millimeter-wave radar 2 (i.e., detection information from the millimeter-wave radar 2) (step S110). More specifically, based on the radar signal, the collision mitigation ECU 7 calculates (or determines) a linear distance from the own vehicle to the object and a horizontal azimuth angle of the object (i.e., an angular position of the object from the direction ahead of the own vehicle).

Figure 3:
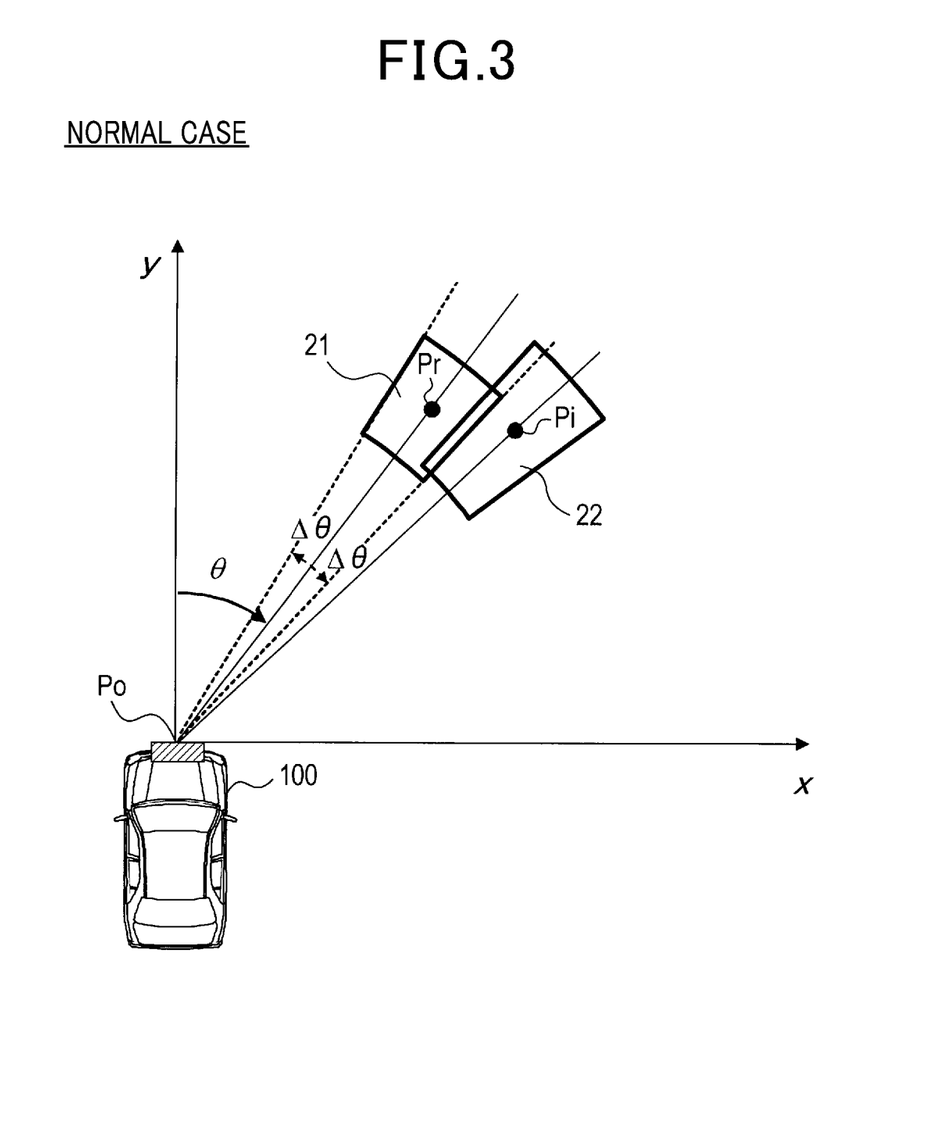
FIG. 3 is a plan view of error regions.

Based on these calculated values, the collision mitigation ECU 7, as shown in FIG. 3, calculates or determines position coordinates (X- and Y-coordinates) of the object in the XY-plane as a detection point Pr of the object in the XY-plane. The X-axis of the XY-plane represents a vehicle-widthwise direction (transverse direction) of the own vehicle, and the Y-axis of the XY-plane represents a vehicle-lengthwise direction of the own vehicle (i.e., the direction ahead of the own vehicle). The detection point Pr of an object having a plurality of detection points detected by the millimeter-wave radar 2 in an object-widthwise direction is set in the middle of the plurality of detection points.

A reference point Po of the XY-plane is set at a nose (or front end) of the own vehicle, on which the millimeter-wave radar 2 is mounted. The detection point Pr is a relative position of the object with respect to the reference point Po. FIG. 3 illustrates an example of an object located ahead of and to the right of the own vehicle. Additionally, in step S110, the collision mitigation ECU 7 may calculate, in addition to the detection point Pr of the object, a relative speed and the like of the object with respect to the own vehicle. In the following, the object detected in step S110 (information about the object detected based on the detection information from the millimeter-wave radar 2) will be referred to as a "radar object."

Subsequently, as shown in FIG. 3, the collision mitigation ECU 7 defines a radar error region 21 centered at the detection point Pr calculated in step S110 (step S120). More specifically, the radar error region 21 has a two-dimensional extension (specified by $\Delta\theta$) centered at the detection point Pr, where an extension of the radar error region 21 in the X-axis direction represents a range of assumed error around the X-coordinate of the detection point Pr and an extension of the radar error region 21 in the Y-axis direction represents a range of assumed error around the Y-coordinate of the detection point Pr. These ranges of assumed error are predetermined based on the characteristics of the millimeter-wave radar 2.

Subsequently, the collision mitigation ECU 7 detects an object based on an image signal transmitted from the monocular camera 3 (i.e., a captured image from the monocular camera 3) (step S130). More specifically, the collision mitigation ECU 7 applies image analysis to the captured image represented by the image signal to identify an object. This identification may be implemented by matching processing using pre-stored object models.

An object model is prepared for each object type, such as a vehicle, a pedestrian, or the like, which allows not only determination of the presence of an object, but also identification of its object type. The collision mitigation ECU 7 determines a Y-coordinate of the object in the XY-plane based on a vertical position of the object in the captured image, and a horizontal azimuth angle of the object (an angular position from the direction ahead of the own vehicle) based on a horizontal position of the object in the capture image.

As the object is located more distant from the own vehicle in the direction ahead of the own vehicle, that is, as the Y-coordinate of the object is increased, a lower end of the object tends to be located at a higher position in the captured image. This allows the Y-coordinate of the object to be determined based on the lower end position of the object in the captured image. In such a specific manner, however, inaccurate detection of the lower end position of the object will leads to lower accuracy in detecting the Y-coordinate of the object.

In addition, a horizontal displacement of the object from the focus of expansion (FOE) of the monocular camera 3 tends to increase with an increasing angular displacement (inclination) of the object from the direction ahead of the own vehicle (specifically, a line of X=0). This allows a horizontal azimuth angle of the object to be determined based on a distance from the FOE to a vertical line passing through the center of the object.

As such, in step S130, the collision mitigation ECU 7 determines the Y-coordinate and the horizontal azimuth angle (angular position) of the object in the XY-plane as the detection point Pi of the object in the XY-plane, as shown in FIG. 3. The detection point Pi of the object is set, for example, in the center in the object's width direction. The detection point Pi of the object represents a relative position of the object with respect to the reference point Po. In the following, the object detected in step S130 (the object detected based on the captured image from the monocular camera 3) will be referred to as an "image object."

Subsequently, as shown in FIG. 3, the collision mitigation ECU 7 defines an image error region 22 centered at the detection point Pi of the image object calculated in step S130 (step S140). More specifically, the image error region 22 has a two-dimensional extension centered at the detection point Pi, where an extension of the image error region 22 in the Y-axis direction represents a range of assumed error around the Y-coordinate of the detection point Pi and an extension of the image error region 22 in the horizontal azimuth angle direction represents a range of assumed error around the horizontal azimuth angle of the detection point Pi. These ranges of assumed error are predetermined based on the characteristics of the monocular camera 3.

Subsequently, sameness determination processing is performed (step S150). In the sameness determination processing, the collision mitigation ECU 7 determines whether or not the radar object and the image object are the same object.

Figure 4:
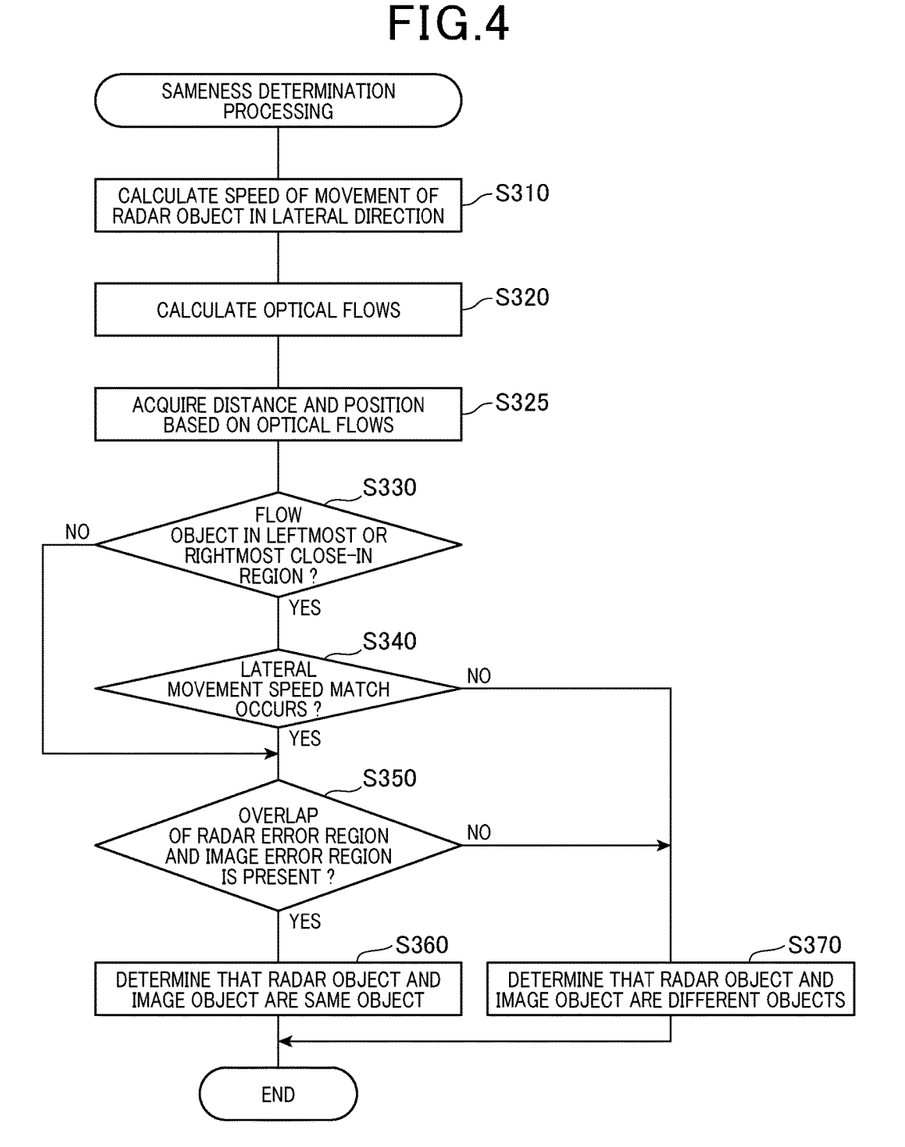
FIG. 4 is a flowchart of sameness determination processing included in the collision mitigation processing.

In the sameness determination processing, as shown in FIG. 4, the collision mitigation ECU 7 calculates a speed of movement of the radar object in the lateral direction (i.e., in the X-direction) (step S310). In step S310, the collision mitigation ECU 7 uses a position history in the past of the radar object to acquire a trajectory of the radar object, and then acquires an X-directional component per unit of time along the trajectory.

Figure 5:
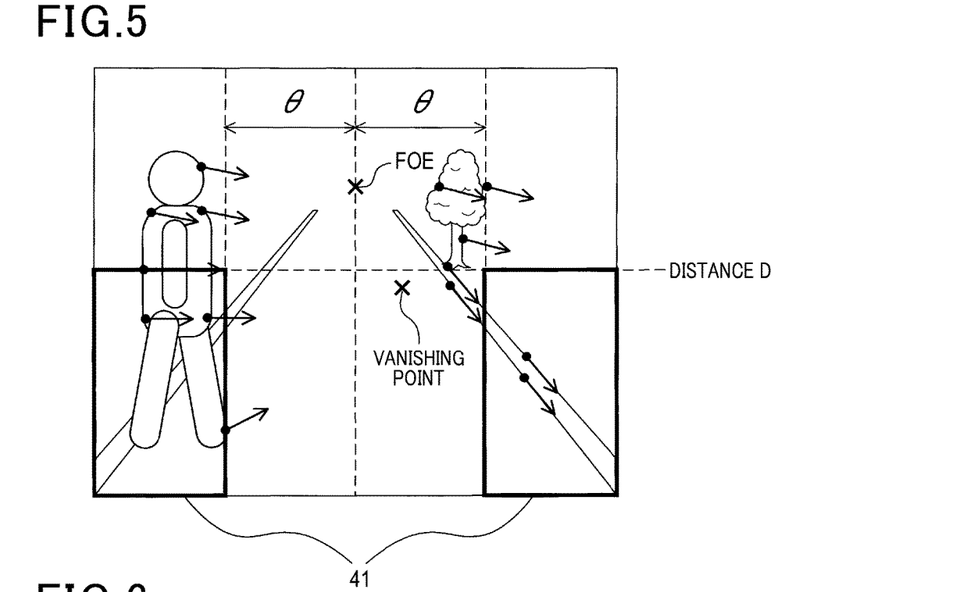
FIG. 5 is a pictorial diagram illustrating optical flows.

Subsequently, the collision mitigation ECU 7 calculates optical flows (step S320). In step S320, as shown in FIG. 5, the collision mitigation ECU 7 sets a large number of feature points at edges points in the captured image where a difference in brightness value between adjacent pixels is equal to or greater than a predetermined value, and acquire, for each of these feature points, a vector representing how the feature point time sequentially moves.

For example, a stationary object, such as a white line or a tree, is detected such that optical flows of the stationary object move in the captured image as if it had emerged from the FOE. In addition, a moving object laterally moving in the captured image, such as a crossing pedestrian, a crossing bicycle or the like, is detected as if it were moving toward a vanishing point other than the FOE.

The collision mitigation ECU 7 acquires a position of and a distance to an object moving toward a vanishing point other than the FOE (such an object being hereinafter referred to as a flow object) (step S325). The position of and the distance to the flow object may be calculated in a method similar to the method used to detect an image object.

Figure 6:
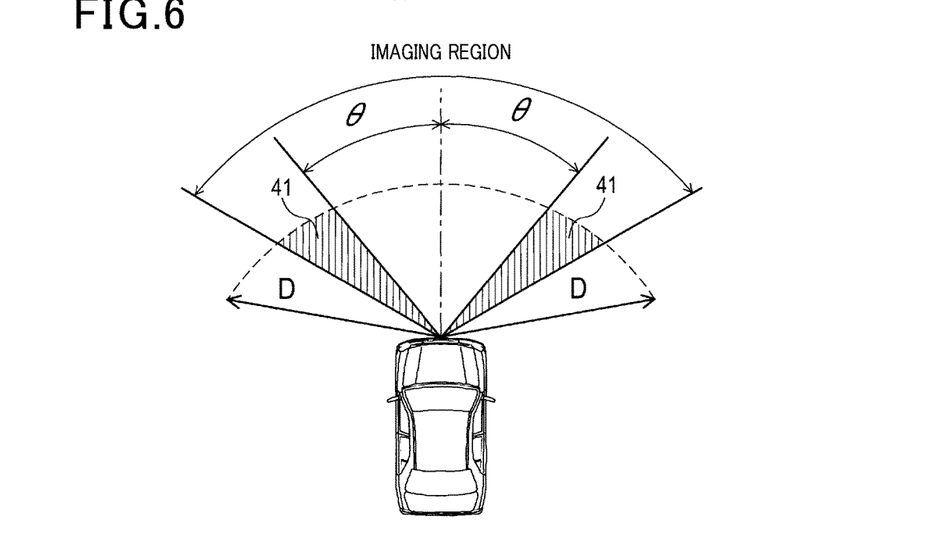
FIG. 6 is a plan view illustrating regions where the optical flows can be accurately utilized.

The collision mitigation ECU 7 determines whether or not a flow object is situated in either one of the leftmost and rightmost close-in regions in the captured image (step S330). In step S330, as shown in FIG. 6, predefined regions 41 in the captured image are an imaging region excluding a region of an angle θ (of about 45 degrees) from the camera axis (the central axis of the camera) and excluding a region more than a distance D away from the own vehicle.

An object can be more greatly recognized when moving at a speed in either one of the predefined regions 41 than when moving at the same speed in the other regions. That is, in the predefined regions 41, movement of an object can be accurately recognized from its optical flows.

The collision mitigation ECU 7 determines whether or not a flow object is situated in either one of the predefined regions 41 in a captured image. In a captured image, as shown in FIG. 5, the predefined regions 41 are rectangular and formed into the bottom left and right edges of the captured image.

If it is determined that a flow object is not situated in any one of the predefined regions 41 (step S330; NO), then the collision mitigation ECU 7 proceeds to step S350. If it is determined that a flow object is situated in either one of the predefined regions 41 (step S330; YES), the collision mitigation ECU 7 determines whether or not a match occurs between the speed of movement of the radar object in the lateral direction and the speed of movement of the flow object in the lateral direction (step S340). In step S340, if the speed of movement of the radar object in the lateral direction matches the speed of movement of the flow object in the lateral direction to within a predefined acceptable tolerance, it may be determined that a match occurs between these speeds. That is, an exact match is not required.

If a match does not occur between the speed of movement of the radar object in the lateral direction and the speed of movement of the flow object in the lateral direction (step S340; NO), then the collision mitigation ECU 7 proceeds to step S370. If a match occurs between the speed of movement of the radar object in the lateral direction and the speed of movement of the flow object in the lateral direction (step S340; YES), then the collision mitigation ECU 7 determines whether or not there is an overlap of the radar error region 21 and the image error region 22 in the XY-plane (step S350). If it is determined that there is an overlap of the radar error region 21 and the image error region 22 (step S350; YES), then the collision mitigation ECU 7 determines that the radar object and the image object are the same object (step S360). Thereafter, the sameness determination processing ends.

If it is determined that there exists no overlap of the radar error region 21 and the image error region 22 (step S350; NO), then the collision mitigation ECU 7 determines that the radar object and the image object are not the same object, that is, they are different objects. Thereafter, the sameness determination processing ends.

Returning to FIG. 2, the collision mitigation ECU 7 performs collision mitigation control based on the position of the detected object (step S190). For example, if the own vehicle is likely to collide with the object (or if the probability of collision is equal to or greater than a predetermined threshold), the collision mitigation ECU 7 transmits a warning signal to an alert unit 6 to alert the driver. If the own vehicle is more likely to collide with the object, the collision mitigation ECU 7 instructs the engine ECU 5 to decrease a driving force of an internal-combustion engine and/or instructs the brake ECU 4 to increase a braking force of the own vehicle.

Figure 1B:
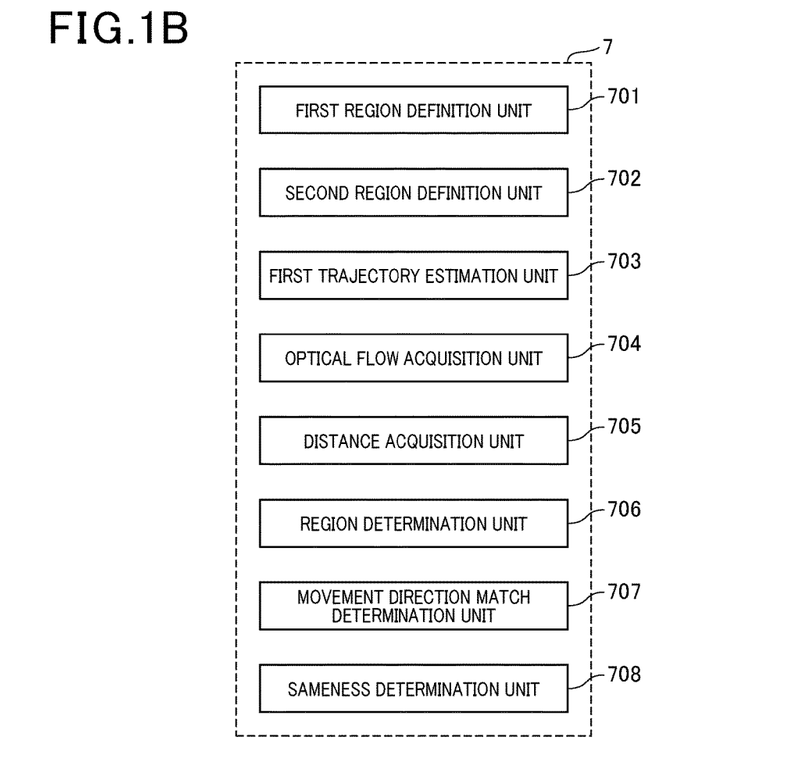
FIG. 1B is a functional block diagram of a collision mitigation ECU.

In the present embodiment, the collision mitigation ECU 7 corresponds to an object detection apparatus of the present invention. FIG. 1B illustrates a functional block diagram of the collision mitigation ECU 7. Various implementations of these blocks described herein can be realized in processor, in software, or in any combination thereof. The collision mitigation ECU 7 includes, as functional blocks, a first region definition unit 701, a second region definition unit 702, a first trajectory estimation unit 703, an optical flow acquisition unit 704, a distance acquisition unit 705, a region determination unit 706, a movement direction match determination unit 707, and a sameness determination unit 708. The first region definition unit 701 is configured to perform steps S110 and S120. The second region definition unit 702 is configured to perform steps S130 and S140. The first trajectory estimation unit 703 is configured to perform step S310. The optical flow acquisition unit 704 is configured to perform step S320. The distance acquisition unit 705 is configured to step S325. The region determination unit 706 is configured to perform step S330. The movement direction match determination unit 707 is configured to step S340. The sameness determination unit 708 is configured to perform steps S350 to S370.

(Advantages)

In the collision mitigation apparatus 1 described as above, the collision mitigation ECU 7 is configured to estimate a trajectory of a first object (referred to as a radar object) that is an object detected by an electromagnetic wave sensor configured to transmit and receive electromagnetic waves to detect a position of the object and image process a captured image acquired from a camera to acquire optical flows of a large number of feature points in the captured image. The collision mitigation ECU 7 is configured to determine whether or not a match occurs between a movement direction based on optical flows of a plurality of feature points, of the large number of feature points, situated around the periphery of the first object and a movement direction based on the trajectory of the first object.

The collision mitigation ECU 7 is configured to, if a match occurs between the movement direction based on optical flows of the plurality of feature points and the movement direction based on the trajectory of the first object, determine that a second object (referred to as a flow object) identified by the plurality of feature points and the first object are the same object.

Such a configuration of the collision mitigation apparatus 1, where the trajectory of the first object detected by the electromagnetic wave sensor and the optical flows acquired via image processing are used to determine whether or not the first object and the second object are the same object, enables more accurate determination as to whether or not the first object and the second object are the same object.

In the collision mitigation apparatus 1 described as above, the collision mitigation ECU 7 is configured to acquire a distance to the second object. The collision mitigation ECU 7 is further configured to determine whether or not the distance to the second object is less than a predetermined distance threshold, and determine whether or not a position of the second object in the captured image is within either one of the rightmost and leftmost regions respectively including the right and left edges of the captured image. The collision mitigation ECU 7 is configured to, if the distance to the second object is less than the predetermined distance threshold and if the position of the second object is within either one of the rightmost and leftmost regions of the captured image, then determine whether or not a match occurs between the movement direction based on the optical flows of the plurality of feature points and the movement direction based on the trajectory of the first object.

In such a configuration of the collision mitigation apparatus 1, if the second object is in a position where movement of the second object can be accurately recognized (specifically, if the distance to the second object is less than the distance threshold and if the position of the second object is within either one of the leftmost and rightmost regions) based on the optical flows of the second object, a determination as to whether or not the first and second objects are the same object can be made using the optical flows. This configuration enables accurate determination as to whether or not the first object and the second object are the same object.

In the collision mitigation apparatus 1 described as above, the collision mitigation ECU 7 is configured to define a first object region including a first detection point representing a relative position of the first object with respect to a reference point in an XY-plane, where an X-axis direction of the XY-plane is a vehicle widthwise (or lateral) direction, and a Y-axis direction of the XY-plane is a vehicle lengthwise (or longitudinal) direction. The collision mitigation ECU 7 is configured to define a second object region including a second detection point representing a relative position of the second object with respect to the reference point in the XY-plane. The collision mitigation ECU 7 is further configured to determine, in cases where the distance to the second object is less than a predetermined distance threshold and the position of the second object in the captured image is within either one of the rightmost and leftmost regions respectively including the right and left edges of the captured image, if there is an overlap of the first object region and the second object region in the XY-plane and if a match occurs between the movement direction based on optical flows of the plurality of feature points and the movement direction based on the trajectory of the first object, determine that the first object and the second object are the same object.

In such a configuration of the collision mitigation apparatus 1, not only if the movement direction based on the trajectory of the first object and the movement direction based on the optical flows coincide, but also if there is an overlap of the first object region and the second object region in the XY-plane, it is determined that the first object and the second object are the same object, which enables accurate determination as to whether or not the first object and the second object are the same object.

In the collision mitigation apparatus 1 described as above, the collision mitigation ECU 7 is configured to, if the distance to the second object is equal to or greater than the predetermined threshold or if the position of the second object in the captured image is outside the rightmost and leftmost regions of the captured image, and if there is an overlap of the first object region and the second object region in the XY-plane, determine that the first object and the second object are the same object.

With such a configuration of the collision mitigation apparatus 1, if the movement of the object cannot be recognized accurately based on the optical flows (that is, if the distance is equal to or greater than the predetermined threshold and the position of the object is outside the rightmost and leftmost regions of the captured image), a determination as to whether or not the first object and the second object are the same object can be made without using the optical flows.

(Modifications)

The present invention is not in any way limited to the above embodiment. Reference numerals and signs used in the above description of the embodiment are appropriately used in the claims as well. The reference numerals and signs are used for easy understanding of the present invention, and should not be construed as limiting the technical scope of the present invention. The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

It should be appreciated that the invention is not to be limited to the collision mitigation apparatus 1 disclosed above and that the present invention can be implemented in numerous ways, including as a system that includes the collision mitigation apparatus 1 as a component, a program for enabling a computer to function as the collision mitigation apparatus 1, a storage medium storing such a program, a collision mitigation method and the like.

In the above embodiment, for example, the lateral movement speed is used in steps S310, S320, S340. Alternatively, a trajectory of movement of the object or its optical flows (referred to as a movement vector) may be used in steps S310, S320, S340.

In the configuration of the above embodiment, if the distance to the second object is less than a predetermined distance threshold and if the position of the second object in the captured image is within either one of the rightmost and leftmost regions respectively including the right and left edges of the captured image (step S330; NO), the collision mitigation ECU 7 proceeds to step S340. Alternatively, step S340 may be performed without performing step S330.

The invention claimed is:

1. An object detection apparatus mounted in a vehicle, comprising:
a first trajectory estimation unit configured to estimate, using a processor, a trajectory of a first object that is an object detected by an electromagnetic wave sensor configured to transmit and receive electromagnetic waves to detect a position of the object;
an optical flow acquisition unit configured to image process, using the processor, a captured image acquired from a camera to acquire movement directions based on optical flows of a large number of feature points in the captured image;
a movement direction match determination unit configured to determine, using the processor, whether or not a match occurs between a movement direction based on optical flows of a plurality of feature points, of the large number of feature points, situated around the periphery of the first object and a movement direction based on the trajectory of the first object; and
a sameness determination unit configured to, if a match occurs between the movement direction based on the optical flows of the plurality of feature points and the movement direction based on the trajectory of the first object, determine, using the processor, that a second object identified by the plurality of feature points and the first object are a same object,
wherein a collision mitigation control of the vehicle is performed based on the position of the object.

2. The apparatus according to claim 1, further comprising:
a distance acquisition unit configured to acquire, using the processor, a distance to the second object; and
a region determination unit configured to determine, using the processor, whether or not the distance to the second object is less than a predetermined distance threshold and determine whether or not a position of the second object in the captured image is within either one of rightmost and leftmost regions respectively including right and left edges of the captured image,
wherein the movement direction match determination unit is configured to, if the distance to the second object is less than the predetermined distance threshold and if the position of the second object in the captured image is within either one of the rightmost and leftmost regions of the captured image, then determine whether or not a match occurs between the movement direction based on the optical flows of the plurality of feature points and the movement direction based on the trajectory of the first object.

3. The apparatus according to claim 1, further comprising:
a first region definition unit configured to define, using the processor, a first object region including a first detection point representing a relative position of the first object with respect to a reference point in an XY-plane with an X-axis direction being a vehicle widthwise direction and a Y-axis direction being a vehicle lengthwise direction; and
a second region definition unit configured to define, using the processor, a second object region including a second detection point representing a relative position of the second object with respect to the reference point in the XY-plane,
wherein the sameness determination unit is configured to, if there is an overlap of the first and second object regions in the XY-plane and if a match occurs between the movement direction based on the trajectory of the first object and the movement direction based on the optical flows of the plurality of feature points, determine that the first object and the second object are the same object.

4. The apparatus according to claim 2, further comprising:
a first region definition unit configured to define, using the processor, a first object region including a first detection point representing a relative position of the first object with respect to a reference point in an XY-plane with an X-axis direction being a vehicle widthwise direction and a Y-axis direction being a vehicle lengthwise direction; and a second region definition unit configured to define, using the processor, a second object region including a second detection point representing a relative position of the second object with respect to the reference point in the XY-plane, wherein the sameness determination unit is configured to, if the distance to the second object is equal to or greater than the predetermined distance threshold or if the position of the second object is outside the rightmost and leftmost regions of the captured image, and if there is an overlap of the first and second object regions in the XY-plane, then determine that the first object and the second object are the same object.

5. The apparatus according to claim 4, wherein the sameness determination unit is configured to, if the distance to the second object is less than the predetermined distance threshold, if the position of the second object in the captured image is outside the rightmost and leftmost regions of the captured image, if there is an overlap of the first and second object regions in the XY-plane, and if a match occurs between the movement direction based on the optical flows of the plurality of feature points and the movement direction based on the trajectory of the first object, determine, using the processor, that a second object identified by the plurality of feature points and the first object are the same object.

6. A method for performing object detection by a vehicle equipped with an electromagnetic wave sensor configured to transmit and receive electromagnetic waves to detect a position of an object and a camera configured to capture images, comprising:

estimating a trajectory of a first object that is an object detected by the electromagnetic wave sensor;

image processing a captured image acquired from the camera to acquire movement directions based on optical flows of a large number of feature points in the captured image;

determining whether or not a match occurs between a movement direction based on optical flows of a plurality of feature points, of the large number of feature points, situated around the periphery of the first object and a movement direction based on the trajectory of the first object;

determining that a second object identified by the plurality of feature points and the first object are a same object when a match occurs between the movement direction based on the optical flows of the plurality of feature points and the movement direction based on the trajectory of the first object; and performing a collision mitigation control of the vehicle based on the position of the object.

7. The method according to claim 6, further comprising:
acquiring a distance to the second object; and
determining whether or not the distance to the second object is less than a predetermined distance threshold and determining whether or not a position of the second object in the captured image is within either one of rightmost and leftmost regions respectively including right and left edges of the captured image, wherein if the distance to the second object is less than the predetermined distance threshold and if the position of the second object in the captured image is within either one of the rightmost and leftmost regions of the captured image, determining whether or not a match occurs between the movement direction based on the optical flows of the plurality of feature points and the movement direction based on the trajectory of the first object.

8. The method according to claim 6, further comprising:
defining a first object region including a first detection point representing a relative position of the first object with respect to a reference point in an XY-plane with an X-axis direction being a vehicle widthwise direction and a Y-axis direction being a vehicle lengthwise direction; and defining a second object region including a second detection point representing a relative position of the second object with respect to the reference point in the XY-plane, wherein if there is an overlap of the first and second object regions in the XY-plane and if a match occurs between the movement direction based on the trajectory of the first object and the movement direction based on the optical flows of the plurality of feature points, determining that the first object and the second object are the same object.

9. The method according to claim 7, further comprising:
defining a first object region including a first detection point representing a relative position of the first object with respect to a reference point in an XY-plane with an X-axis direction being a vehicle widthwise direction and a Y-axis direction being a vehicle lengthwise direction; and defining a second object region including a second detection point representing a relative position of the second object with respect to the reference point in the XY-plane, wherein if the distance to the second object is equal to or greater than the predetermined distance threshold or if the position of the second object is outside the rightmost and leftmost regions of the captured image, and if there is an overlap of the first and second object regions in the XY-plane, determining that the first object and the second object are the same object.

10. The method according to claim 9, wherein
if the distance to the second object is less than the predetermined distance threshold, if the position of the second object in the captured image is outside the rightmost and leftmost regions of the captured image, if there is an overlap of the first and second object regions in the XY-plane, and if a match occurs between the movement direction based on the optical flows of the plurality of feature points and the movement direction based on the trajectory of the first object, determining that a second object identified by the plurality of feature points and the first object are the same object.

* * * * *